United States Patent [19]

Ohmura et al.

[11] 4,298,518

[45] Nov. 3, 1981

[54] POLYAMIDE RESIN COMPOSITION

[75] Inventors: Yasuhiro Ohmura; Yukinobu Murakami; Ryoji Hidaka, all of Kita-Kyushu, Japan

[73] Assignee: Mitsubishi Chemical Industries, Ltd., Tokyo, Japan

[21] Appl. No.: 827,256

[22] Filed: Aug. 24, 1977

[30] Foreign Application Priority Data

Sep. 6, 1976 [JP] Japan .............................. 51-106530
Feb. 23, 1977 [JP] Japan .............................. 52-18974
Jul. 6, 1977 [JP] Japan .............................. 52-40167

[51] Int. Cl.$^2$ .......................... C08K 5/09; C08K 5/20; C08K 5/34
[52] U.S. Cl. ...................... 260/32.6 NA; 260/45.7 R; 260/45.75 C; 260/45.75 T; 260/45.8 NT
[58] Field of Search ............... 260/45.75 E, 32.6 NA, 260/45.8 NT, 45.75 T, 45.9 NC, 78 S, 78 L; 544/198

[56] References Cited

U.S. PATENT DOCUMENTS

| | | | |
|---|---|---|---|
| 2,705,227 | 3/1955 | Stamatoff | 260/45.75 C |
| 2,929,816 | 3/1960 | Chamberlain | 8/107 |
| 3,663,506 | 5/1972 | Knopf et al. | 260/45.9 NC |
| 3,751,394 | 8/1973 | Hermann | 260/45.75 E |
| 3,755,221 | 8/1973 | Hitch | 260/32.6 NA |
| 3,793,289 | 2/1974 | Koch et al. | 260/45.8 NT |
| 3,801,521 | 4/1974 | Smith et al. | 260/78 S |
| 3,959,219 | 5/1976 | Aoyama et al. | 260/45.8 NT |
| 3,980,616 | 9/1976 | Kimura et al. | 260/78 S |
| 4,001,177 | 1/1977 | Tsutsumi et al. | 260/45.8 NT |

Primary Examiner—Donald E. Czaja
Assistant Examiner—R. A. White
Attorney, Agent, or Firm—Oblon, Fisher, Spivak, McClelland & Maier

[57] ABSTRACT

A polyamide resin composition comprises melamine cyanurate with or without a copper compound, an alkali metal halide, a tin compound, a bisamide compound or a bisureido compound.

6 Claims, 3 Drawing Figures

POLYAMIDE RESIN COMPOSITION

BACKGROUND OF THE INVENTION

1. Field of the Invention:

The present invention relates to a polyamide resin composition. More particularly, it relates to a polyamide resin composition having excellent appearance and flameproofing characteristic.

2. Description of the Prior Art:

To flameproof polyamide resin compositions, it has been proposed to add melamine (Japanese Patent Publication No. 1714/1972); to add cyanuric acid (U.S. Pat. No. 3,980,616) or to add both melamine and cyanuric acid (U.S. Pat. No. 4,001,177).

In the case of the addition of melamine, satisfactory flame-proofing effect could not be imparted without adding more than ten wt. parts of melamine to 100 wt. parts of polyamide resin. The melamine sublimes during the molding operation to deposit on the mold, which has been known as plate-out, whereby undesired parting or straining of the molded product are caused. Alternatively, melamine or decomposed material is bled out on the surface of the molded product by aging the molded product for a long time which has been known as the blooming phenomenon. The appearance is disadvantageously inferior.

In the case of the addition of cyanuric acid, the flameproofing effect can be expected by the addition of a smaller amount of cyanuric acid in comparison with melamine. However, the mechanical properties of the molded product are inferior and the blooming phenomenon is disadvantageously severe.

In the case of the addition of both cyanuric acid and melamine, it is necessary to add more than ten wt. parts of a mixture of melamine and cyanuric acid (1:1) to 100 wt. parts of polyamide resin in order to impart a satisfactory flameproofing effect, and plate-out and the blooming phenomena are not small enough to be satisfactory.

The inventors have worked to overcome these disadvantages.

SUMMARY OF THE INVENTION

It is an object of the present invention to provide a polyamide resin composition which has satisfactory flameproofing characteristic and is suitable for molded product.

It is another object of the present invention to provide a polyamide resin composition which has satisfactory flameproofing characteristic without plate-out and blooming phenomena.

The foregoing and other objects of the present invention has been attained by providing a polyamide resin composition which comprises melamine cyanurate and polyamide resin.

DETAILED DESCRIPTION OF THE PREFERRED EMBODIMENTS

The polyamide resins used in the present invention can be polyamides produced by polymerization of a lactam having a larger than three membered ring, a polymerizable ω-amino acid, and polycondensations of a dibasic acid and a diamine.

Suitable polyamide resins include polymers produced by polymerization of ε-caprolactam, aminocaproic acid, enantholactam, 7-aminoheptanoic acid, 11-aminoundecanoic acid, 9-aminononanoic acid and α-pyrrolidone, α-piperidone, and polymers produced by polycondensations of a diamine such as hexamethylenediamine, nonamethyllendiamine, undecamethylenediamine, dodecamethylenediamine and meta-xylylenediamine with a dicarboxylic acid such as terephthalic acid, isophthalic acid, adipic acid, sebacic acid, dodecane dibasic acid and glutaric acid, and copolymers thereof such as nylon 4; 6; 7; 8; 11; 12; 6.6; 6.9; 6.10; 6.11; 6.12; 6T; 6/6.6; 6/12; 6/6T etc.

Two or more polyamide resins can be blended. The polyamide resin can contain the other resins such as polyesters, polyolefins, polytetrafluoroethylenes, ABS, AS, ethylene-vinylacetate copolymers etc.

The melamine cyanurate used in the present invention is a reaction product of cyanuric acid and melamine, usually in a mole ratio of about 1:1. For example, the melamine cyanurate can be obtained by mixing an aqueous solution of cyanuric acid with an aqueous solution of melamine and reacting them at about 90° to 100° C., with stirring, and filtering the resulting precipitate. The white solid is preferably pulverized into fine powder to use it. The melamine cyanurate commercially sold can also be used with or without pulverizing it. The amino group or hydroxyl group of melamine cyanurate can be substituted with other substituents, if necessary.

Figure 1:
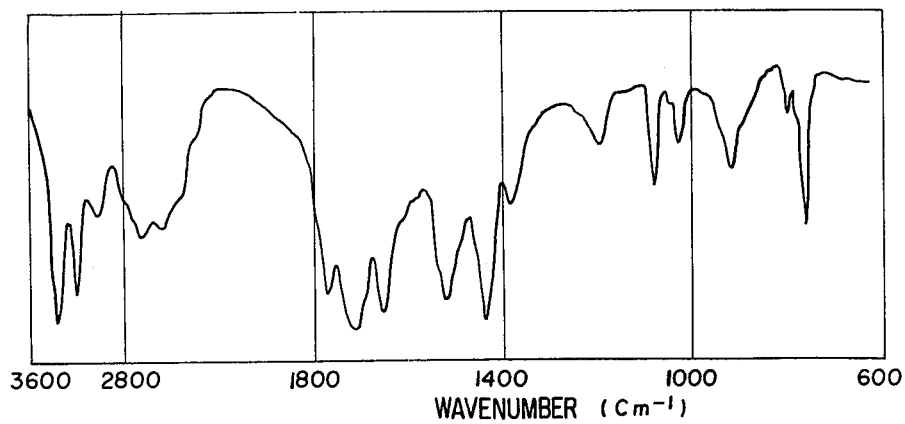
Figure 2:
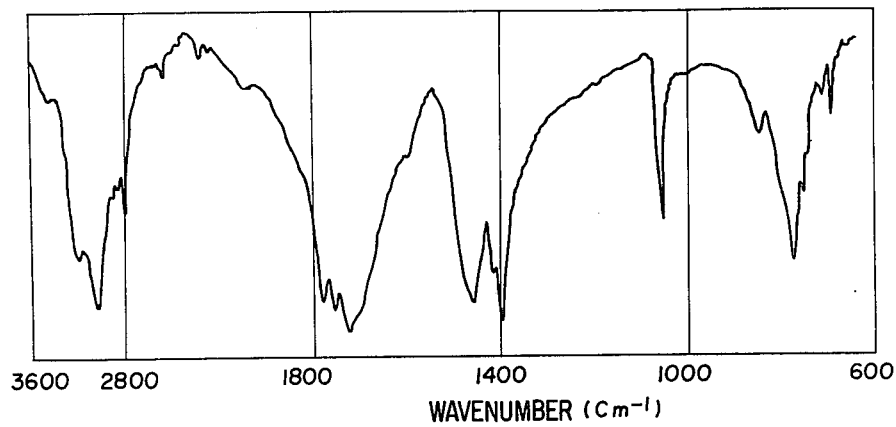
Figure 3:
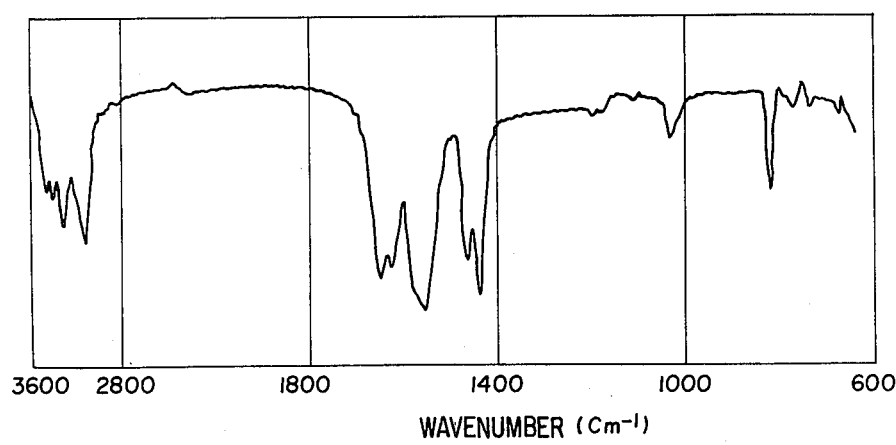

The melamine cyanurate is quite different from a mixture of cyanuric acid and melamine. In order to show the fact infrared spectra of melamine cyanurate, cyanuric acid and melamine are shown in FIG. 1, FIG. 2 and FIG. 3, respectively.

The melamine cyanurate is added to the polyamide resin at a ratio of 1 to 20 wt.% preferably 3 to 15 wt.%. When the amount of melamine cyanurate is too small, the flameproofing effect is not satisfactory. When the amount of melamine cyanurate is too much the mechanical properties may be deteriorated, disadvantageously.

In the present invention, the heat resistance, the moisture resistance and the resistance to discoloring in aging can be further improved by the combination of the melamine cyanurate with a copper compound, a mixture of a copper compound and an alkali metal halide or a mixture of a copper compound, an alkali metal halide and a tin compound.

The copper compound is not critical as long as it is uniformly miscible with the polyamide resin.

Suitable copper compounds include inorganic copper salts such as cuprous chloride, cupric chloride, cuprous iodide, cupric sulfate, cupric nitrate, cupric phosphate and cupric phosphite and organic copper salts such as cupric acetate, cupric salicylate, cupric stearate, cupric benzoate, cupric lactate and cupric sebacate and copper chelate compounds. It is optimum to use cuprous chloride.

Suitable alkali metal halides include potassium iodide, potassium bromide, potassium chloride, sodium iodide, sodium bromide, sodium chloride, etc. It is optimum to use potassium iodide.

Suitable tin compounds include inorganic tin salts such as stannous chloride, stannic chloride and organic tin salts such as stannous oxalate and stannic oxalate, stannous hydroxide, stannic hydroxide etc. It is preferable to use inorganic stannous salts especially stannous chloride.

The amounts of these additives to 100 wt. parts of polyamide resin are 0.001 to 0.1 wt. part preferably 0.005 to 0.05 wt. part of the copper compound as Cu, 0.005 to 1 wt. part, preferably 0.02 to 0.5 wt. part of the alkali metal halide as alkali metal, and 5 to 10 wt. parts of alkali metal halide are present per 1 wt. part as Cu of the copper compound, and 0.001 to 0.5 wt. part preferably 0.005 to 0.1 wt. part of the tin compound as Sn.

When the amount of the copper compound is too much, the coloring is caused by free copper metal during the injection molding whereby the marketable value of the molded product is reduced.

When the amounts of the alkali metal halide and the tin compound are too much, the mechanical properties of the molded product are lowered.

In the present invention, the polyamide resin composition in which the melamine cyanurate is well dispersed can be obtained by combining the melamine cyanurate with the specific bisamide. When it is molded, the disadvantage of deterioration of appearance etc. caused by the aggregates of the melamine cyanurate can be prevented to obtain smooth surface. The industrial value is remarkably high.

The bisamide compounds used in the present invention can be as follows.

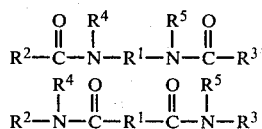

wherein $R^1$ represents a divalent hydrocarbon moiety; $R^2$ and $R^3$ respectively represent a monovalent hydrocarbon moiety; $R^4$ and $R^5$ respectively represent hydrogen atom or a monovalent hydrocarbon moiety.

More particularly, $R^1$ can be alkylene, allylene and allylenedialkylene groups, $R^2$ and $R^3$ respectively can be alkyl, aryl, aralkyl, alkaryl and cycloalkyl groups; and $R^4$ and $R^5$ respectively hydrogen atom, alkyl, aryl aralkyl, alkaryl and cycloalkyl groups.

Suitable $R^1$ include $C_1$–$C_{12}$ alkylene groups such as methylene, ethylene, trimethylene, tetramethylene, hexamethylene octamethylene, decamethylene and dodecamethylene groups, arylene groups such as phenylene group, naphthylene group; arylenedialkylene group (two alkylene groups are substituted with hydrogen atoms of aromatic hydrocarbons such as xylylene group) and diarylenetrialkylene groups such as diphenylenetrimethylene group. Suitable $R^2$ and $R^3$ include $C_2$–$C_{30}$ alkyl groups such as ethyl, butyl, pentyl, hexyl, heptyl, octyl, nonyl, decyl, undecyl dodecyl, tridecyl, tetradecyl, pentadecyl, hexadecyl, heptadecyl, octadecyl, nonadecyl, eicosyl, heneicosyl docosyl, heptacosyl and triaconsyl groups; aryl groups such as phenyl and naphthyl groups; aralkyl groups such as benzyl and phenyl ethyl groups; alkaryl groups such tolyl and ethyl naphthyl groups; and cycloalkyl groups such as cyclohexyl group. $R^2$ and $R^3$ can be the same or different.

Suitable $R^4$ and $R^5$ include hydrogen atom and $C_1$–$C_{12}$ alkyl groups such as methyl, ethyl, propyl, butyl, hexyl, octyl, decyl and dodecyl groups; aryl groups such as phenyl and naphthyl groups; aralkyl groups such as benzyl and phenyl ethyl groups; alkaryl groups such as tolyl and ethyl naphthyl groups and cycloalkyl groups such as cyclohexyl group. $R^4$ and $R^5$ can be the same or different.

The $R^1$ and $R^3$ groups can have a branched chain.

Suitable bisamide compounds having the formula (I) include alkylene bisaliphatic acid amides, arylene bisaliphatic amides and arylenedialkylene bisaliphatic acid amides which are produced by reacting a diamine with a fatty acid wherein the diamines include ethylenediamine, propylenediamine, butylenediamine, hexamethylenediamine, octamethylenediamine, decamethylenediamine, dodecamethylenediamine, arylenediamine such as phenylenediamine and naphthylenediamine; and arylenedialkylenediamines such as xylenediamine; and the fatty acids include stearic acid, hexanic acid, octanic acid, decanic acid, laurylic acid, myristic acid, palmitic acid, arachidic acid, behenic acid, oleic acid, elaidic acid, montanic acid etc.

It is preferable to use N,N'-methylene bisstearic acid amide, N,N'-ethylene bisstearic acid amide etc.

The bisamide compounds having the formula (II) can be compounds produced by reacting a monoamine with a dicarboxylic acid wherein the monoamine can be alkylamines such as ethylamine, methylamine, butylamine, hexylamine, decylamine, pentadecylamine, octadecylamine and dodecylamine; arylamines such as aniline, and naphthylamine; aralkylamines such as benzylamine; and cycloalkylamines such as cyclohexylamine etc. and the dicarboxylic acids can be terephthalic acid, p-phenylenedipropionic acid, succinic acid, and adipic acid.

It is preferable to use dioctadecyl dibasic acid amides such as N,N'-dioctadecyl terephthalic acid amide, N,N'-diethylenedioctadecyl terephthalic acid amide, N,N'-dioctadecyl-p-phenylenedipropionic acid amide, N,N'-dioctadecyl succinic acid amide, N,N'-dioctadecyl adipic acid amide, and N,N'-dimethyloctadecyl adipic acid amide etc.

One or more the bisamide compounds having the formula (I) or (II) can be used.

The bisamide compound is added at a ratio of 0.01 to 3 wt. parts preferably 0.05 to 1 wt. part to 100 wt. parts of the polyamide resin.

When the amount of the bisamide compound is too small, the effect can not be expected. When the amount of the bisamide compound is too much, the flameproofing effect is lowered, disadvantageously.

When a specific bisureido compound is added together with the melamine cyanurate, the polyamide resin composition having improved parting property and stable molding property for a long time can be obtained.

The bisureido compounds used in the invention have the formula $$R^7\text{---NHCONH---}R^6\text{---NHCONH---}R^8 \quad (III)$$

wherein $R^7$ and $R^8$ are the same or different and respectively represent alkyl groups preferably $C_8$–$C_{32}$ alkyl groups especially $C_{12}$–$C_{20}$ straight chain or branched chain alkyl groups, such as dodecyl, hexadecyl, octadecyl and octaeicosyl group; $R^6$ represents divalent aromatic hydrocarbon moiety such as

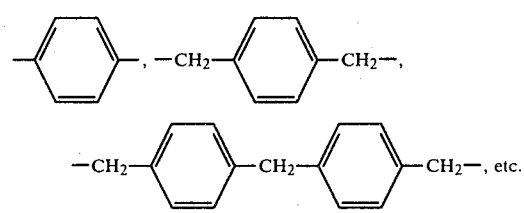

Suitable bisureido compounds having the formula (III) include

1: 1,4-bis(3-octadecylureido)benzene,
2: 1,4-bis(3-dodecylureido)benzene,
3: 1,4-bis(3-octadecylureidomethyl)benzene,
4: 1,4-bis(3-dodecylureidomethyl)benzene;
5: bis[p-(3-octadecylureidomethyl)phenyl] methane and
6: bis[p-(3-dodecylureidomethyl)phenyl] methane.

The bisureido compound having the formula (III) is added at a ratio of 0.005 to 5 wt. parts preferably 0.01 to 1 wt. part especially 0.03 to 0.3 wt. part to 100 wt. parts of the polyamide resin.

When the amount of the bisureido compound is too small, the desired effect can not be attained. When the amount of the bisureido compound is too much, the phase separation is caused to deteriorate the appearance or to deteriorate the physical properties of the resin composition.

The additives can be blended to the polyamide resin by various known methods in desired steps before the molding step for preparing a molded product.

The simplest method is a method of dry blending the additives to the polyamide resin. The dry blended composition can be melt extruded to prepare pellets.

It is also possible to prepare master pellets by blending excess amount of the additives to the polyamide resin and then to dilute the master pellets with polyamide resin.

The molded products can be prepared by molding the blended composition or pellets in various molding machines for injection, extrusion, blow or compression etc. in the conventional methods. The addition of the additives can be also attained by a molding machine. In the molding step, it is preferable to heat it at lower than 270° C. especially lower than 250° C. in order to prevent the decomposition of the flameproofing agent.

In the composition of the present invention, a reinforcing agent such as glass fiber and carbon fiber; a filler such as clay, silica, alumina, silica-alumina glass beads asbestos, graphite and gypsum and other additives such as dye, pigment, a stabilizer and an antistatic agent can be added.

The polyamide resin compositions of the present invention have excellent flameproofing effect and the molded products have the following advantages.

(1) The blooming phenomenon is not caused in the condition of high temperature or high humidity. The surface condition and appearance of the molded product are excellent for a long time and the molded product can be used for precision parts without trouble.

(2) The plate-out is not caused. The condition of the molding step can be easily set. No defective product caused by inferior parting or stain is found.

(3) The active ingredient is a non-halogen type flameproofing agent so that there is no problem of toxicity and metal corrosion.

The present invention will be further illustrated by certain examples which are included for purposes of illustration only and are not intended to be limiting unless otherwise specified.

The combustion test was carried out by measuring a combustion test piece of 5"×½"×1/16" by Standard UL-94 (Underwriters Laboratories Inc. of U.S.A.) in the vertical combustion.

The Izod impact strength was measured by ASTM Standard D-256 using a test piece having a width of ½" and a notch.

The Blooming property was measured by Japanese Industrial Standard C 5023 "Electronics part humidity resistant test" at 40° C. in 95% RH for 500 hours in a program wide range constant temperature and humidity vessel (ETAC Engineering Co.).

EXAMPLE 1

A 94 wt. parts of nylon 6 having a relative viscosity of 2.5 (at 25° C. in 98% $H_2SO_4$ 1 g/100 ml solution. Novamid 1010 C manufactured by Mitsubishi Chemical Ind. Ltd.) was admixed with 6 wt. parts of melamine cyanurate powder (manufactured by Sanwa Chemical Co.) and the mixture was extruded by a Bent type extruder having a diameter of 40 mm to prepare pellets having a diameter of 2.5 mm and a length of 2.5 mm.

The melamine cyanurate used in the Examples was white powder which thermally decomposed upon heating. Differential thermal analysis, at a heating rate of 10° C./min. under $N_2$, showed an absorption peak at 427° C. (361° C. for melamine, 418° C. for cyanuric acid). Thermogravimetric analysis of the melamine cyanurate under the same conditions showed 5% reduction at 373° C. (303° C. for melamine, 322° C. for cyanuric acid) and 10% reduction at 389° C. (321° C. for melamine, 353° C. for cyanuric acid).

The pellets were molded to form a combustion test piece of 5"×½"×1/6" and a test piece for impact strength test which has a width of ½" and a notch, and a test piece for humidity resistant test which has a diameter of 30 mm and a thickness of 3 mm.

In the molding operation, the surface of the mold was observed after 30 shots of continuous molding. The plate-out phenomenon was not found.

The test results of the test pieces are shown in Table 1.

REFERENCES 1 TO 3

The process of Example 1 was repeated to mold the composition except using 6 wt. parts of melamine powder, 6 wt. parts of cyanuric acid powder or 6 wt. parts of a mixture of melamine and cyanuric acid (molar ratio of 1:1) instead of melamine cyanurate.

When melamine or the mixture of melamine and cyanuric acid was added, the plate-out phenomenon was found after 10 shots of continuous molding to deposit white powder on the surface of the mold.

The test results of the molded products are also shown in Table 1.

TABLE 1

| | Flame-proofing agent | UL-94 flame-proofing effect | Izod impact strength | Plate-out property | Blooming property |
|---|---|---|---|---|---|
| Exp. 1 | Melamine cyanurate | V-0 | 3.5 | O | O |
| Ref. 1 | Melamine | V-2 | 3.5 | X | X |
| Ref. 2 | Cyanuric acid | V-0 | 2.5 | O | XX |
| Ref. 3 | Mixture of melamine and cyanuric acid | V-2 | 3.5 | X | XX |

Note:
O : no phenomenon was found
X : phenomenon was found
XX : remarkable phenomenon was found

EXAMPLE 2

A 87.5 wt. parts of nylon 6 (Novamid 1010C) was admixed with 12.5 wt. parts of melamine cyanurate and the mixture was molded in accordance with the process of Example 1. In the molding operation, no plate-out phenomenon was found after 30 shots of continuous molding.

The results of the molded product are shown in Table 2.

REFERENCES 4 TO 5

The process of Example 2 was repeated to mold the composition except using 12.5 wt. parts of melamine powder or 12.5 wt. parts of melamine and cyanuric acid (molar ratio of 1:1) instead of melamine cyanurate.

The plate-out phenomenon was found after 10 shots of continuous molding to deposit white powder on the surface of mold.

The results of the molded products are also shown in Table 2.

TABLE 2

| | Flame-proofing agent | UL-94 flame-proofing effect | Izod impact strength | Plate-out property | Blooming property |
|---|---|---|---|---|---|
| Exp. 2 | Melamine cyanurate | V-0 | 3.3 | O | O |
| Ref. 4 | Melamine | V-0 | 3.3 | X | X |
| Ref. 5 | Mixture of melamine and cyanuric acid | V-0 | 2.5 | X | XX |

EXAMPLES 3 TO 5

A 86 wt. parts of pellets of nylon 6 (Novamid 1010C) was admixed with 2.1 wt. parts of cuprous chloride in a dry blend. The mixture was extruded by an extruder having a diameter of 40 mm at 240° C. to prepare pellets having a diameter of 2.5 mm and a length of 2.5 mm.

A 90 wt. parts of nylon 6 (the same) was admixed with 10 wt. parts of melamine cyanurate (manufactured by Sanwa Chemical K.K.) pulverized to a diameter of less than 100μ in a dry blend. The mixture was extruded to prepare pellets by the same procedure.

The pellets and potassium iodide and stannous chloride were used to feed them at the ratio shown in Table 3 to a 3 ounces injection extruder to mold Type IV dumbbell specimen in ASTM D-638.

The test pieces were kept in a hot air oven controlling the temperature at 150° C. and then the tensile strength and the degree of discoloring were tested for the heat aging test.

The test pieces were also kept in a program wide range constant temperature and humidity vessel at 85° C. and 85% RH and then the tensile strength and the degree of discoloring were tested.

The results are shown in Table 4.

TABLE 3

| | (wt. parts) | | |
|---|---|---|---|
| | Exp. 3 | Exp. 4 | Exp. 5 |
| Nylon 6 | 90.5 | 90.5 | 90.5 |
| Melamine cyanurate | 9.5 | 9.5 | 9.5 |
| Cuprous chloride (as Cu) | 0.05 | 0.05 | 0.05 |
| Potassium iodide | 0 | 0.5 | 0.5 |
| Stannous chloride (as Sn) | 0 | 0 | 0.005 |

TABLE 4

| | Exp. 3 | Exp. 4 | Exp.5 |
|---|---|---|---|
| Tensile strength before test (kg/cm²) | 810 | 810 | 810 |

TABLE 4-continued

| | Exp. 3 | Exp. 4 | Exp.5 |
|---|---|---|---|
| Heat aging test | | | |
| Tensile strength | | | |
| after 250 hours (kg/cm²) | 750 | 800 | 800 |
| after 500 hours (kg/cm²) | 600 | 760 | 800 |
| Color after 500 hours | black brown | reddish brown | pale reddish brown |
| Resistance test at high temperature and high humidity | | | |
| Tensile strength | | | |
| after 250 hours (kg/cm²) | 750 | 800 | 810 |
| after 500 hours (kg/cm²) | 600 | 790 | 810 |
| Color after 500 hours | pale reddish brown | pale brown | pale brown |

Tensile strength was measured by ASTM D-638.
Color was observed.

EXAMPLES 6 TO 8

A 94 wt. parts of pellets of nylon 6 (Novamid 1010C) was admixed with 6 wt. parts of melamine cyanurate (manufactured by Nippon Carbide K.K.) (200 mesh pass) and the additives shown in Table 5.

The mixture was extruded by Bent type extruder having a diameter of 40 mm at 240° C. to prepare pellets having a diameter of 2.5 mm and a length of 2.5 mm.

The pellets were molded by a 3 ounces injection extruder to prepare combustion test pieces of 5"×½"×1/16" and discs of a diameter of 100 mm and a thickness of 0.8 mm for evaluating dispersibility.

The results of the combustion test and the evaluation of dispersibility of the test pieces are shown in Table 5.

TABLE 5

| | Additive | | Flame-proofing effect | Dispersibility |
|---|---|---|---|---|
| | Type | Amount (wt. part) | | |
| Exp. 6 | ethylene bisstearyl amide | 0.5 | V-0 | O |
| Exp. 7 | ethylene bisstearyl amide | 0.1 | V-0 | Δ |
| Exp. 8 | methylene bisstearyl amide | 0.5 | V-0 | O |

The dispersibility was measured by selecting three circular parts having a diameter of 10 mm on the discs and the number of aggregates of melamine cyanurate in the circular parts was counted by observation under transmitting light and the results are rated using the following three degrees of aggregation;
 O less than 5
 Δ 5 to 20
 X more than 21
The test piece having a smaller number of aggregates is considered to show good dispersibility.

EXAMPLES 9 TO 10

100 wt. parts of pellets of nylon 6 (Novamid 1010C) was admixed with 11 parts of melamine cyanurate powder (manufactured by Sanwa Chemical K.K.) and the additives shown in Table 6. The mixture was dry-blended in a tumbler.

The mixture was continuously molded at the resin temperature of 250° C. and the mold temperature of 80° C. for an injection time of 8 seconds and a mold cooling time of 0 second by an injection molding machine with molds for molding two test pieces of 174"×½"×5" and ⅛"×½"×5".

The molding operation was continued under said molding condition until a deformation occurred, such as a concavity or a curve on the molded product by the push-out pin. The number of shots until the deformation was counted. The parting property was evaluated by the number of shots. The larger number of shots shows good parting property. The results are shown in Table 6.

TABLE 6

| | Additive Type | Amount (wt. part) |
|---|---|---|
| Exp. 9 | 1,4-bis(3-octadecylureidomethyl benzene | 0.1 |
| Exp. 10 | 1,4-bis(3-octadecylureidomethyl benzene | 0.05 |
| | calcium stearate | 0.05 |
| | kaolinite | 0.05 |

| | Parting property number of shots | Flameproofing effect 1/16" | Flameproofing effect 1/32" | Izod impact strength (kg · cm/cm) |
|---|---|---|---|---|
| Exp. 9 | 80–90 | V-0 | V-0 | 3.0 |
| Exp. 10 | >100 | V-0 | V-0 | 3.2 |

What is claimed is:

1. A polyamide resin composition which comprises a polyamide resin and from 1 to 20 wt.% of melamine cyanurate.

2. The polyamide resin composition according to claim 1 which further comprises from 0.001 to 0.1 wt. part as Cu of a copper compound per 100 wt. parts of said polyamide resin.

3. The polyamide resin composition according to claim 1 which further comprises from 0.005 to 1 wt. part as alkali metal of an alkali metal halide per 100 wt. parts of said polyamide resin, and 1 wt. part as Cu of a copper compound for each 5 to 10 wt. parts of said alkali metal halide.

4. The polyamide resin composition according to claim 3 which further comprises from 0.001 to 0.5 wt. parts as Sn of a tin compound.

5. A polyamide resin composition according to claim 1 which further comprises from 0.01 to 3 wt. parts per 100 wt. parts of said polyamide resin of a bisamide compound having the formula

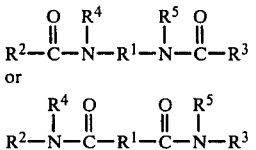

or $$R^2-N-\overset{O}{\underset{|}{C}}-R^1-\overset{O}{\underset{|}{C}}-N-R^3$$
$$\phantom{R^2-N}\overset{R^4}{\phantom{|}}\phantom{-C-R^1-C-}\overset{R^5}{\phantom{|}}$$

wherein $R^1$ represents a divalent hydrocarbon moiety; $R^2$ and $R^3$ each represent a monovalent hydrocarbon moiety; and $R^4$ and $R^5$ each represent a hydrogen atom or a monovalent hydrocarbon moiety.

6. A flame resistant composition which comprises a polyamide resin and a flame retardant amount of melamine cyanurate.

* * * * *

UNITED STATES PATENT AND TRADEMARK OFFICE
CERTIFICATE OF CORRECTION

PATENT NO. : 4,298,518
DATED : Nov. 3, 1981
INVENTOR(S) : Yasuhiro Ohmura, et. al.

It is certified that error appears in the above—identified patent and that said Letters Patent is hereby corrected as shown below:

Please correct the Priority Data to read as follows:

[30]---Foreign Application Priority Data

Sep. 6, 1976 [JP] Japan..............51-106530

Feb. 23, 1977 [JP] Japan..............52-18974

Apr. 8, 1977 [JP] Japan..............52-40167

Jul. 6, 1977 [JP] Japan..............52-80784 rather than

UNITED STATES PATENT AND TRADEMARK OFFICE
CERTIFICATE OF CORRECTION

PATENT NO. : 4,298,518
DATED : Nov. 3, 1981
INVENTOR(S) : Yasuhiro Ohmura, et. al.

It is certified that error appears in the above—identified patent and that said Letters Patent is hereby corrected as shown below:

[30]---Foreign Application Priority Data

Sep. 6, 1976 [JP] Japan...................51-106530

Feb. 23, 1977 [JP] Japan...................52-18974

Jul. 6, 1977 [JP] Japan...................52-40167 as it now appears.

*Signed and Sealed this*

*Twenty-third* Day of *February 1982*

[SEAL]

*Attest:*

GERALD J. MOSSINGHOFF

*Attesting Officer*     *Commissioner of Patents and Trademarks*